(12) United States Patent
Matsushita et al.

(10) Patent No.: US 10,739,536 B2
(45) Date of Patent: Aug. 11, 2020

(54) OPTICAL CONNECTION COMPONENT

(71) Applicant: SUMITOMO ELECTRIC INDUSTRIES, LTD., Osaka-shi, Osaka (JP)

(72) Inventors: Naoki Matsushita, Yokohama (JP); Tetsuya Nakanishi, Yokohama (JP); Toshiki Taru, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/439,839

(22) Filed: Jun. 13, 2019

(65) Prior Publication Data

US 2019/0293877 A1    Sep. 26, 2019

Related U.S. Application Data

(63) Continuation of application No. PCT/JP2017/028296, filed on Aug. 3, 2017.

(30) Foreign Application Priority Data

Dec. 16, 2016 (JP) .................. 2016-244527

(51) Int. Cl.
*G02B 6/42* (2006.01)
*G02B 6/245* (2006.01)
*G02B 6/36* (2006.01)

(52) U.S. Cl.
CPC ........... *G02B 6/4202* (2013.01); *G02B 6/245* (2013.01); *G02B 6/36* (2013.01); *G02B 6/4243* (2013.01)

(58) Field of Classification Search
CPC ........ G02B 6/246; G02B 6/36; G02B 6/3652; G02B 6/4202; G02B 6/4243
See application file for complete search history.

(56) References Cited

U.S. PATENT DOCUMENTS 6,004,639 A * 12/1999 Quigley ................ B29C 70/086
                                                   428/36.3
10,379,299 B2 * 8/2019 Suematsu ................ G02B 6/44
10,539,746 B2 * 1/2020 Nakanishi ............ G02B 6/0365
(Continued)

FOREIGN PATENT DOCUMENTS

| CN | 105824079 A | 8/2016 |
| JP | 2010-128112 A | 6/2010 |
| JP | 2011-7946 A | 1/2011 |

*Primary Examiner* — Thomas A Hollweg
*Assistant Examiner* — Mary A El-Shammaa
(74) *Attorney, Agent, or Firm* — Faegre Drinker Biddle & Reath LLP

(57) ABSTRACT

An optical connection component 1 includes an optical fiber 10 having a bent portion BA, and a fiber fixing part 20. The optical fiber 10 includes a glass fiber 11 and a resin coating 12. The fiber fixing part 20 includes an optical array member 24 and a protective resin 23. A distal end of the glass fiber 11 and an end surface of the optical array member 24 form a reference surface S. The bent portion BA is formed in a region including the exposed glass fiber 11. A predetermined section in a region C, which continues from the bent portion BA on a side opposite to an end portion of the optical fiber 10 supported by the fiber fixing part 20 with the bent portion BA interposed therebetween, is inclined to approach the reference surface S while going away from the bent portion BA.

4 Claims, 5 Drawing Sheets

(56) References Cited

U.S. PATENT DOCUMENTS

| | | | |
|---|---|---|---|
| 2007/0196059 A1* | 8/2007 | Kojima | G01K 11/32 |
| | | | 385/100 |
| 2010/0247042 A1 | 9/2010 | Suzuki et al. | |
| 2013/0101258 A1* | 4/2013 | Hikosaka | G02B 6/387 |
| | | | 385/78 |
| 2015/0323753 A1 | 11/2015 | Furuya et al. | |
| 2016/0287894 A1* | 10/2016 | Arai | A61N 5/0603 |
| 2016/0291261 A1* | 10/2016 | Izumi | G02B 6/3839 |
| 2018/0136409 A1* | 5/2018 | Mitose | G02B 6/3636 |
| 2018/0156987 A1* | 6/2018 | Nakanishi | G02B 6/03616 |
| 2018/0361691 A1* | 12/2018 | Matsushita | G02B 6/02395 |
| 2019/0072705 A1* | 3/2019 | Kaneuchi | G02B 6/2552 |
| 2019/0129101 A1* | 5/2019 | Kaneuchi | G02B 6/3855 |
| 2019/0235016 A1* | 8/2019 | Bagung | G01R 31/2812 |

\* cited by examiner

Fig.2
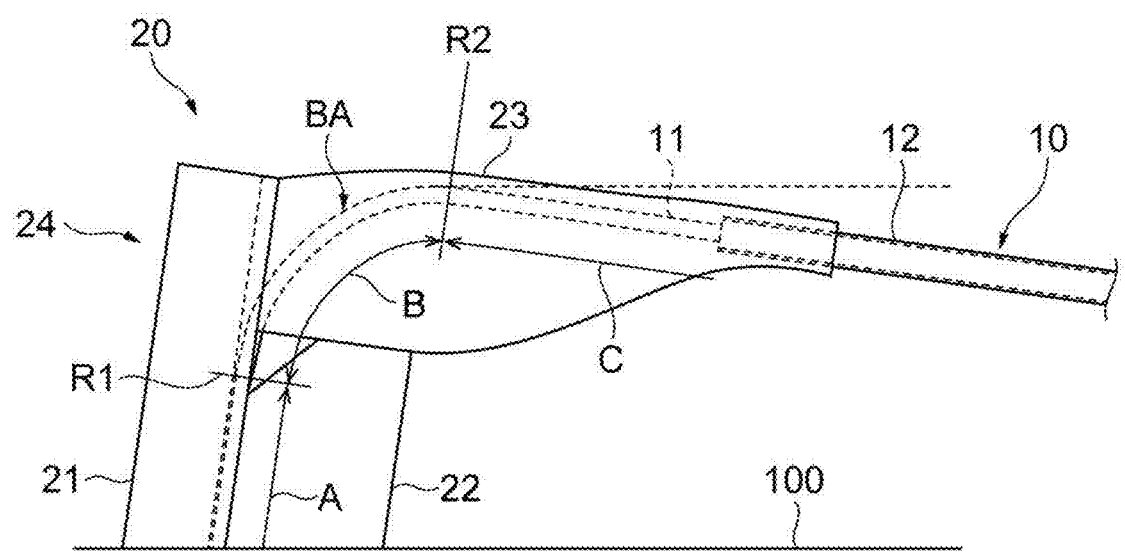
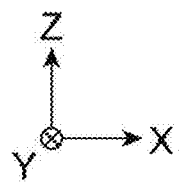

OPTICAL CONNECTION COMPONENT

TECHNICAL FIELD

The present invention relates to an optical connection component.

BACKGROUND ART

In accordance with miniaturization of optical modules, reduction in length of optical fibers used in the vicinity of an optical module is required. Therefore, optical connection components in which an optical fiber is fixed in a state of being bent by 90° have been examined (for example, Patent Literature 1).

CITATION LIST

Patent Literature

Patent Literature 1: Japanese Unexamined Patent Publication No. 2011-7946

SUMMARY OF INVENTION

Technical Problem

However, it is known that optical fibers used in the foregoing optical connection component have a significant fiber length tolerance during manufacturing. Accordingly, a long fiber length is retained for an optical fiber when an optical connection component is manufactured, such that an optical fiber is not affected by a tolerance. Therefore, when an optical connection component is attached to the exterior of an optical module, both ends of an optical fiber are fixed in a state of being deflected in a longitudinal direction. In this case, since a state in which stress is applied to a bent portion of the optical fiber in the optical connection component continues, there is a possibility that damage to the optical connection component may be accelerated.

The present invention has been made in consideration of the foregoing circumstances, and an object thereof is to provide an optical connection component in which stress applied to the optical fiber can be reduced.

Solution to Problem

According to an aspect of the invention of the present application, there is provided an optical connection component including an optical fiber having a bent portion, and a fiber fixing part configured to fix the optical fiber to an optical module. The optical fiber includes a glass fiber and a resin coating which covers the glass fiber. The resin coating is removed and the glass fiber is exposed at one end of the optical fiber. The fiber fixing part includes an optical array member which supports an end portion of the exposed glass fiber and a protective resin which coats the optical fiber. A distal end of the glass fiber and an end surface of the optical array member form a reference surface configured to be fixed to the optical module. The bent portion is formed in a region including the exposed glass fiber and is covered with the protective resin. A section of a region, which continues from the bent portion on a side opposite to an end portion of the optical fiber supported by the fiber fixing part with the bent portion interposed therebetween, is inclined to approach the reference surface while going away from the bent portion.

Advantageous Effects of Invention

According to the present invention, an optical connection component in which stress applied to the optical fiber can be reduced is provided.

BRIEF DESCRIPTION OF DRAWINGS

FIG. 2 is an enlarged view of a portion in the vicinity of a fiber fixing part in the optical connection component.

DESCRIPTION OF EMBODIMENT

Figure 1:
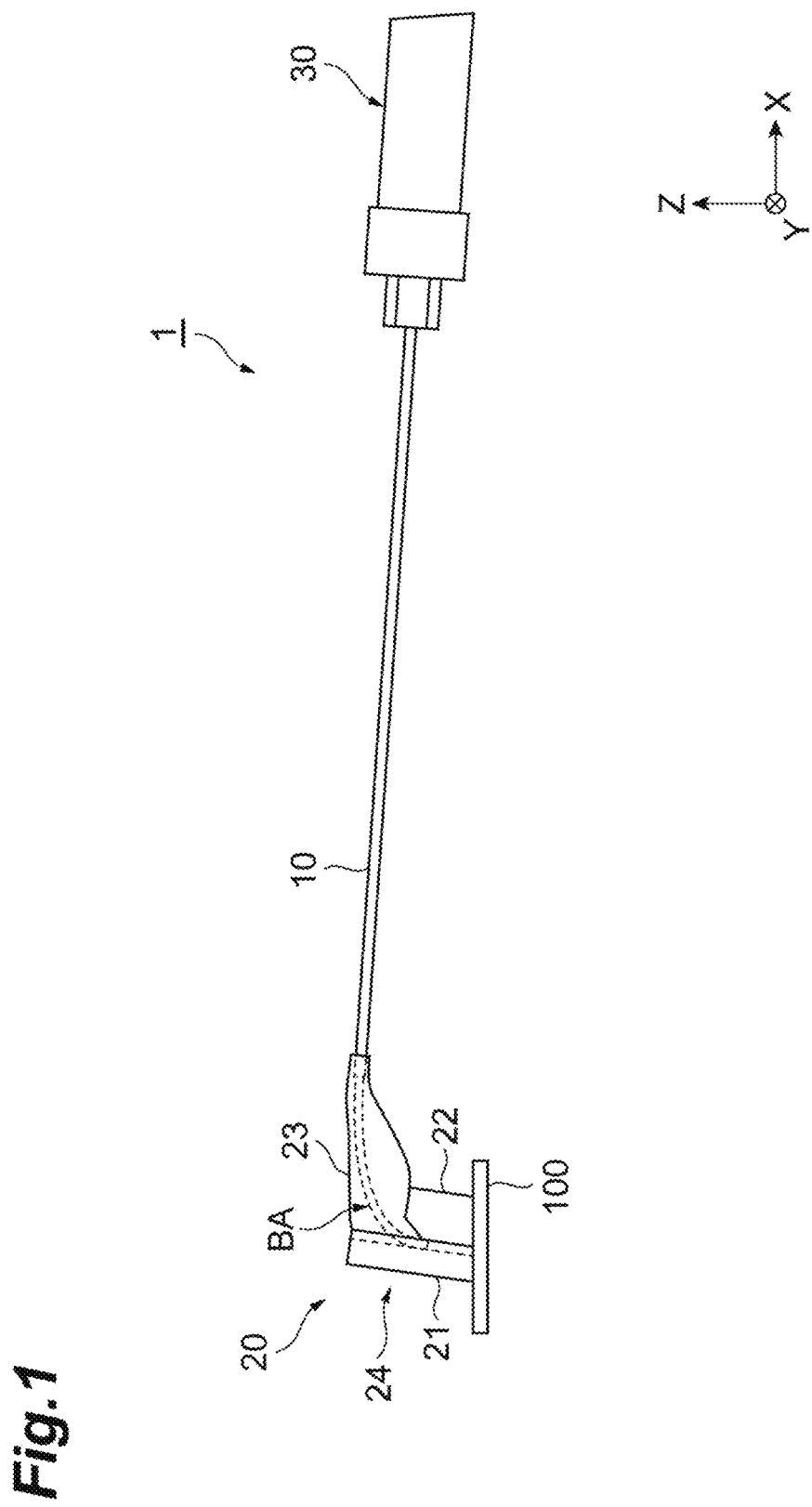
FIG. 1 is a view for describing an optical connection component according to an embodiment of the present invention and an application state thereof.

Description of Embodiment of Invention of Present Application

First, an embodiment of the invention of the present application will be listed and described.

(1) According to an aspect of the present embodiment, there is provided an optical connection component including an optical fiber having a bent portion, and a fiber fixing part configured to fix the optical fiber to an optical module. The optical fiber includes a glass fiber and a resin coating which covers the glass fiber. The resin coating is removed and the glass fiber is exposed at one end of the optical fiber. The fiber fixing part includes an optical array member which supports an end portion of the exposed glass fiber and a protective resin which coats the optical fiber. A distal end of the glass fiber and an end surface of the optical array member form a reference surface configured to be fixed to the optical module. The bent portion is formed in a region including the exposed glass fiber and is covered with the protective resin. A section of a region, which continues from the bent portion on a side opposite to an end portion of the optical fiber supported by the fiber fixing part with the bent portion interposed therebetween, is inclined to approach the reference surface while going away from the bent portion.

In the optical connection component according to the present embodiment, the optical fiber is inclined to approach the reference surface while going away from the bent portion. According to such a structure, it is possible to reduce stress generated due to a deflection occurring when the optical connection component including the optical fiber is fixed to the optical module. Therefore, stress applied to the optical fiber can be reduced.

(2) According to the aspect of the present embodiment, in the optical connection component, the section may be configured to be a shorter section of a region in which the resin coating is removed continuously from a boundary between the region and the bent portion, and a region over 5 mm from the boundary between the region and the bent portion in the region in which the resin coating is removed.

It is conceivable that the region, in which the resin coating is removed and the glass fiber is exposed, is likely to be deflected compared to a region in which the resin coating is provided. In addition, it is conceivable that stress in the case of being deflected is likely to be applied to the bent portion in the region over 5 mm from the boundary between the region and the bent portion. Therefore, when the fiber in these regions has an inclined form, stress applied to the bent portion can be more effectively reduced.

(3) According to the aspect of the present embodiment, in the optical connection component, the section may have an inclination angle with respect to the reference surface of the optical fiber larger than 0° and smaller than 5°.

When the inclination angle is within the foregoing range, even if the fiber length of optical fibers is distributed within a tolerance range, since the stress applied to the bent portion can be within an appropriate range, increase in stress applied to the optical fiber can be prevented.

(4) According to the aspect of the present embodiment, in the optical connection component, the end portion of the optical fiber supported by the fiber fixing part has an inclination angle φ with respect to a direction perpendicular to the reference surface, the bent portion has a bend angle θ, and the inclination angle φ and the bend angle θ may satisfy the relationships $0° \leq \varphi \leq 15°$ and $90° \leq \varphi + \theta$.

When the inclination angle φ of the end portion of the optical fiber and the bending angle θ of the bent portion satisfy the foregoing relationships, a connection loss caused by reflection of light on the end surface of the optical fiber can be curbed. Stress applied to the bent portion of the optical fiber can be reduced and performance of the optical connection component is also improved.

Details of Embodiment of Invention of Present Application

Specific examples of an optical connection component according to the present invention will be described below with reference to the drawings. The present invention is not limited to these examples and is intended to include those disclosed in the claims and all of modifications within the meaning and scope equivalent to the claims.

Figure 3:
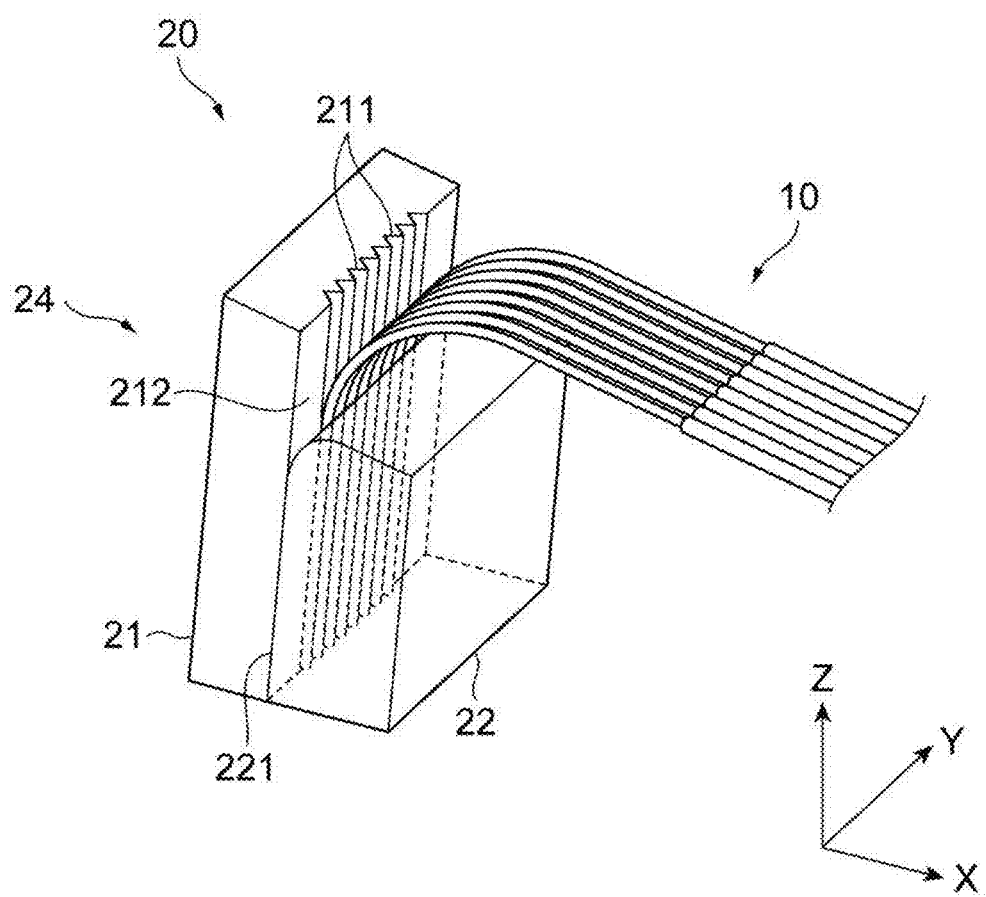
FIG. 3 is a perspective view of a portion in the vicinity of the fiber fixing part.

FIG. 1 is a view for describing an optical connection component according to an embodiment of the present invention and an application state thereof. In addition, FIG. 2 is an enlarged view of a portion in the vicinity of a fiber fixing part 20 in an optical connection component 1. In addition, FIG. 3 is a perspective view of a portion in the vicinity of the fiber fixing part 20. In FIG. 3, a protective resin included in the fiber fixing part 20 is not illustrated. In addition, in FIGS. 1 to 3, and FIG. 4 which will be described below, the positional relationship between the optical connection component and an electronic substrate is described in an orthogonal coordinate system (XYZ coordinate system).

FIG. 1 illustrates a state in which the optical connection component 1 is connected to an electronic substrate 100 including an optical integrated circuit chip and the like. The optical connection component 1 includes an optical fiber 10 of which one end portion has a bent portion BA (bent optical fiber) subjected to heating and bending treatment, the fiber fixing part 20 which is attached to the end portion where the bent portion BA of the optical fiber 10 is formed, and a connector 30 which is attached to the other end portion opposite to the bent portion BA side of the optical fiber 10. The electronic substrate 100 functions as a part of an optical module described in the present embodiment. The optical connection component 1 is a part attached to this optical module.

The optical fiber 10 has a glass fiber 11 (bare fiber) and a resin coating 12 which surrounds the glass fiber 11. Since the bent portion BA is formed in the optical fiber 10, a multi-mode optical fiber (MMF) is generally utilized. However, the optical fiber 10 is not limited thereto, and a single-mode optical fiber (SMF) or the like may be used. For example, the fiber diameter of the optical fiber 10 can be 125 μm. In addition, the fiber length of the optical fiber 10 can be within a range of approximately several centimeters to several tens of centimeters.

The resin coating 12 of the optical fiber 10 is removed in the end portion on one side where the bent portion BA is formed. The fiber fixing part 20 has a function of fixing the end portion on one side of the optical fiber 10 including the bent portion BA. The optical fiber 10 is fixed by the fiber fixing part 20 and is connected to the electronic substrate 100 in a state in which its shape is maintained. In the optical connection component 1 according to the present embodiment, a plurality (eight in FIG. 3) of optical fibers 10 are arranged in parallel in one direction (Y-axis direction) while forming a so-called tape-like multi-core optical fiber. The number of optical fibers 10 arranged in parallel is not particularly limited, and only one optical fiber may be adopted.

The connector 30 is connected to the end portions on the other side of the optical fibers 10. The connector 30 has a function of optically connecting the optical fibers 10 and another optical fiber for premises wiring or a single-mode optical fiber (SMF) such as an external transmission line to each other.

The fiber fixing part 20 and the optical fiber 10 in the vicinity thereof will be described with reference to FIG. 2. As illustrated in FIG. 2, the optical fiber 10 includes a region A (first non-bent section which continues to bent portion BA) having a curvature d of 0.1 [1/mm] or smaller, a region B (section corresponding to the bent portion BA subjected to heating and bending treatment) having a predetermined curvature d of 0.4 [1/mm] or larger, and a region C (second non-bent section which continues to the bent portion BA) having a curvature d of 0.1 [1/mm] or smaller. A boundary R1 indicates the boundary between the region A and the region B, and a boundary R2 indicates the boundary between the region B and the region C. The section (bent portion BA) subjected to heating and bending treatment is formed to have a bent shape through heating and bending treatment. The region A and the region B are formed in a portion in which the resin coating 12 is removed such that a surface of the glass fiber 11 (glass portion) is exposed. The optical fiber 10 extends substantially in a Z-axis direction in the region A, is bent by substantially 90° in the region B, and extends substantially in an X-axis direction in the region C. However, details of a bending angle and the like of the optical fiber 10 will be described below.

A method for heating and bending treatment of the regions B corresponding to the bent portions BA of the optical fibers 10 is not particularly limited. For example, a burner, a $CO_2$ laser, arc discharge, or a heater can be utilized. A $CO_2$ laser can easily have an irradiation intensity, an irradiation range, and an irradiation time thereof adjusted, thereby having characteristics advantageous to minute controlling of a curvature distribution. It is conceivable that since glass becomes opaque near a wavelength of 10 [μm] which is a general wavelength of a $CO_2$ laser, the irradiation energy of a $CO_2$ laser is absorbed by a surface layer of an optical fiber and is transferred due to re-radiation and heat conduction. When the power of a $CO_2$ laser is excessively high, the temperature on the surface layer of an optical fiber steeply rises to the evaporation temperature of glass. As a result, the surface shape of the optical fiber cannot be maintained any longer. Therefore, the irradiation power of a $CO_2$ laser is appropriately adjusted such that distortion is eliminated in a fiber cross section of a heated portion by causing a state, in which the surface layer glass of an optical fiber does not evaporate and the temperature has risen to the point of operation or higher, to continue for a predetermined time.

A portion around the bent portions BA of the optical fibers 10 (region B) are fixed by the fiber fixing part 20. The fiber fixing part 20 has a V-groove substrate 21 and a lid 22 which support the regions A of the optical fibers 10, and a protective resin 23 which reinforces and protects the bent portions BA of the optical fibers 10. The V-groove substrate 21 includes a holding surface 212 on which V-grooves 211 for arraying the regions A of the optical fibers 10 are formed. In addition, the lid 22 restricts the positions of the regions A of the arrayed optical fibers 10 together with the V-grooves 211 using a holding surface 221. The V-groove substrate 21 and the lid 22 function as an optical array member 24 for arraying the optical fibers 10 by supporting the end portions of the optical fibers 10 in the fiber fixing part 20.

When the fiber fixing part 20 is constituted of the V-groove substrate 21 and the lid 22, a holding portion for holding the optical fibers 10 is formed by the V-grooves 211 formed on the holding surface 212 of the V-groove substrate 21, and the holding surface 221 of the lid 22 facing the holding surface 212. An end surface of the holding portion (end surface of the electronic substrate 100) is flat in a state in which the optical fibers 10 are exposed to the end surface, thereby forming a light input-output end surface for the optical fibers 10. The light input-output end surface for the optical fibers 10, and the optical integrated circuit chip and the like of the electronic substrate 100 are optically connected to each other with the fiber fixing part 20 interposed therebetween. According to such a structure, improvement of mechanical strength in a connection portion between the optical fibers 10 and the electronic substrate 100 can be achieved.

For example, regarding the V-groove substrate 21 and the lid 22, multi-component glass such as Pyrex (registered trademark), a $SiO_2$ substrate, or the like can be used, but they are not limited thereto. However, when an end surface of the fiber fixing part 20 is connected to the electronic substrate 100, there are cases in which bonding is performed using a UV-curable resin. In this case, if a material, through which UV light is transmitted, is used in at least a portion of the V-groove substrate 21 and the lid 22, bonding and fixing using a UV-curable resin can be appropriately performed.

The length of the V-groove substrate 21 in the longitudinal direction (Z-axis direction in FIGS. 1 to 3) of the holding portion is set to be longer than the length of the lid 22 in the same Z-axis direction. The regions A of the optical fibers 10 are supported by the V-groove substrate 21 and the lid 22, and the bent portion BA (region B) is disposed away from the lid 22. The protective resin 23 is provided to reinforce this bent portion BA (region B) and the region C which continues from the bent portion BA. The protective resin 23 is provided to cover the region in which the resin coating 12 is removed and the glass fiber 11 is exposed in the optical fibers 10. A material of the protective resin 23 is not particularly limited, and a UV-curable resin or the like can be used.

The optical array member 24 of the fiber fixing part 20 is not limited to the structure described in the present embodiment. For example, in the present embodiment, the optical array member 24 for fixing the regions A in the end portions of the optical fibers 10 is constituted of the V-groove substrate 21 and the lid 22. However, for example, the optical array member 24 may be constituted of a single member. In addition, the shape for holding the regions A of the optical fibers 10 is not limited to those of the V-grooves 211. For example, a structure of holding a plurality of optical fibers 10 using a member, in which penetration holes corresponding to the number of optical fibers 10 are provided such that the regions A of the optical fibers 10 are respectively inserted into the penetration holes, may be adopted. In this case, a ferrule having a structure similar to that of a single-core optical connector such as an FC, an SC, and an LC, or a multi-core connector such as an MPO and an MT can be applied to a portion of the fiber fixing part 20 in which the holding portion is formed.

When the foregoing optical connection component 1 is attached to the exterior of the optical module, the fiber fixing part 20 and the connector 30 are in a fixed state. The optical connection component 1 is attached to an upper portion of the electronic substrate 100 in this state and is used in a manner of being integrated with the optical module.

Here, the shape of the optical fiber 10 in the optical connection component 1 according to the present embodiment will be described. As described above, the bent portion BA is formed in the optical fiber 10 through heating and bending treatment. The bending angle is set in consideration of the extending direction of the fiber when the optical connection component 1 is attached to the electronic substrate 100.

Figure 4:
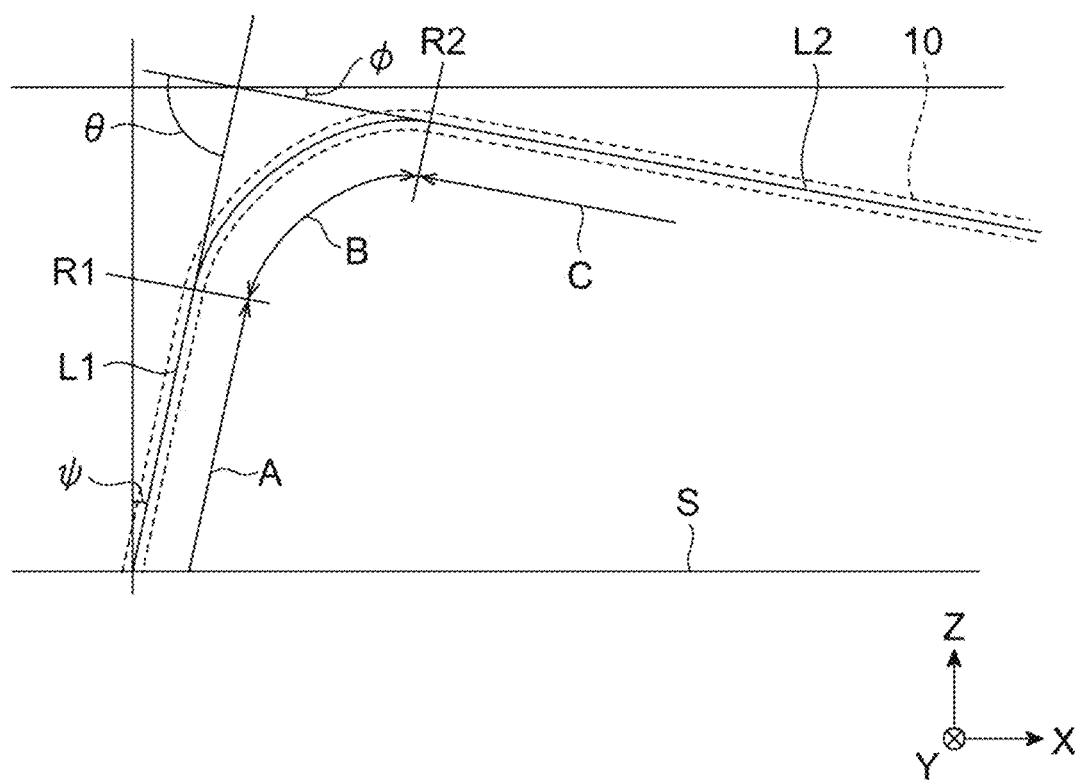
FIG. 4 is a view for describing an angle of each portion of an optical fiber.

FIG. 4 is a view for describing an angle of each portion of the optical fiber 10. In FIG. 4, the optical fiber 10 is indicated with a dotted line, and extending directions L1 and L2 of the optical axes in the region A and the region C in the optical fiber 10 are indicated with solid lines. In addition, a reference surface S is a surface extending along the XY-plane and is indicated with a solid line extending in the X-axis direction in FIG. 4. The reference surface S is a surface corresponding to a main surface of the electronic substrate 100 to which the optical connection component 1 is connected. That is, the reference surface S is the end surface of the fiber fixing part 20 of the optical connection component 1 and corresponds to the light input-output end surface of the optical fiber 10.

In the optical connection component 1 of the present embodiment, in a predetermined section, the region C which continues from the bent portion BA (region B) is inclined to approach the reference surface while going away from the bent portion BA. In other words, when an inclination angle of the region C in the optical fiber 10 of the optical connection component 1 in the downward direction (negative Z-direction) with respect to the extending direction (XY-plane) of the reference surface S (inclination angle in the case of having the boundary R2 between the region B and the region C as a reference) is $\phi$, $0°<\phi$ is satisfied.

Moreover, an inclination angle of the region A in the end portion of the optical fiber 10 of the optical connection component 1 with respect to a direction perpendicular to the reference surface S is referred to as $\varphi$. The bending angle of the bent portion BA, that is, an angle formed by two straight lines respectively extending along the region A and the region C is referred to as $\theta$. At this time, in the optical connection component 1, the inclination angle $\varphi$ of the region A in the optical fiber 10 can have a relationship of $0°\leq\varphi\leq15°$. In addition, regarding the bending angle $\theta$, the sum of $\varphi$ and $\theta$ may be 90° or wider, that is, the bending angle $\theta$ may have a relationship of $90°\leq\varphi+\theta$.

In the optical connection component 1 of the present embodiment, since the region C which continues from the bent portion BA (region B) of the optical fiber 10 is inclined to approach the reference surface, it is possible to alleviate the stress applied to the optical fiber 10 after being assembled as the optical module. Particularly, according to the foregoing configuration, stress applied to the bent portion BA can be favorably alleviated.

In optical connection components in the related art, the region C of an optical fiber continuously extending in the X-axis direction from the bent portion BA is designed such that it becomes parallel to the reference surface S (the main surface of the electronic substrate 100 which is an attachment target for the optical connection component). Here, a fiber length tolerance occurs in the optical fibers during manufacturing, and it is general that this fiber length tolerance is larger than the dimensional tolerance of an optical module to which the optical connection component including the optical fibers is attached. Therefore, it has been general to employ a technique of preparing for a situation in which the fiber length becomes insufficient due to the tolerance, by manufacturing optical fibers such that the central value of the lengths of the optical fibers becomes slightly larger than the dimensions of the optical module. However, when an optical connection component is manufactured using optical fibers which are manufactured such that the central value of the fiber lengths becomes larger than the dimensions of the optical module, there are cases in which the optical fibers may be deflected when being fixed to the exterior of the optical module. That is, if a fiber fixing part and a connector are disposed in accordance with the exterior of the optical module, most of the optical fibers are longer than the dimensions of the optical module due to the central value of the fiber lengths being longer than the dimensions of the optical module. Therefore, there are cases in which portions corresponding to the regions C of the optical fibers may be pushed from both ends and a deflection may occur. Stress derived from a force for tending to return to the original state is applied to the deflected optical fibers. It is conceivable that this stress significantly acts particularly on the bent portions BA of the optical fibers. Although the stress derived from bending is released during the heating and bending treatment, the bent portions BA of the optical fibers are fragile compared to the linear regions A and C. Therefore, there has been concern of a possibility of performance of the optical fibers not being able to be sufficiently exhibited and the life-span of the optical connection component also being shortened if a state in which stress is being applied to the bent portion BA continues.

In contrast, in the optical connection component 1 according to the present embodiment, in a predetermined section, the region C which continues from the bent portion BA (region B) is inclined to approach the reference surface while going away from the bent portion BA. It is conceivable that when the fiber fixing part 20 and the connector 30 are disposed in accordance with the exterior of the optical module, the region C in the optical fiber 10 is deflected to protrude to a side approaching the reference surface, in consideration of the shape and the like of the exterior of the optical module reduced in length. Therefore, since the predetermined section of the region C which continues from the bent portion BA is inclined before approaching the reference surface while going away from the bent portion BA, stress generated due to a deflection can be reduced and stress applied to the optical fiber can be reduced, compared to the case in which an optical fiber extending parallel to the reference surface is deflected. Therefore, this stress being applied to the bent portion BA can also be reduced, so that shortening of the life-span of the optical connection component can be curbed.

In the region C in the optical fiber 10, "the predetermined section" inclined to approach the reference surface while going away from the bent portion BA can be a region in which the glass fiber 11 is continuously exposed from the boundary R2 between the region and the bent portion BA (region in which the resin coating 12 is removed). In addition, when the region in which the glass fiber 11 is exposed (region in which the resin coating 12 is removed) is long in a manner corresponding thereto, it is preferable that a section over approximately 5 mm from at least the boundary R2 between the region and the bent portion BA be set as "the predetermined section". The region including the exposed glass fiber 11 is likely to be deflected compared to a region in which the resin coating 12 is provided. Particularly, it is conceivable that stress in the case of being deflected is likely to be applied to the bent portion BA in the region over approximately 5 mm from the boundary R2 between the region and the bent portion BA. Therefore, when this section has a shape inclined to approach the reference surface while going away from the bent portion BA, stress applied to the bent portion BA can be more effectively reduced. However, the predetermined section, that is, the inclined region may be retained longer than the foregoing region. In addition, even when the predetermined section is shorter than the foregoing region, the effect of reducing stress applied to the bent portion BA is exhibited.

In addition, the inclination angle $\phi$ of the region C is selected in accordance with the condition of deflection in the optical fiber 10 when the optical connection component is attached to the optical module (attached to the exterior). The inclination angle $\phi$ can be set to be larger than 0° and smaller than 5°, that is, to satisfy a relationship of $0°<\phi\leq5°$. This numerical range is selected based on the fiber length tolerance of the optical fiber 10. In a case in which the length of the optical fiber 10 is selected in consideration of the fiber length tolerance, when the optical connection component is attached to the optical module, the region C in the optical fiber 10 is deflected while having the boundary R2 between the region and the bent portion BA as an origin, so that the angle thereof becomes an angle within the foregoing numerical range approximately. Therefore, when the inclination angle $\phi$ is within the foregoing numerical range, stress applied to the bent portion BA can be more effectively reduced.

Figure 5:
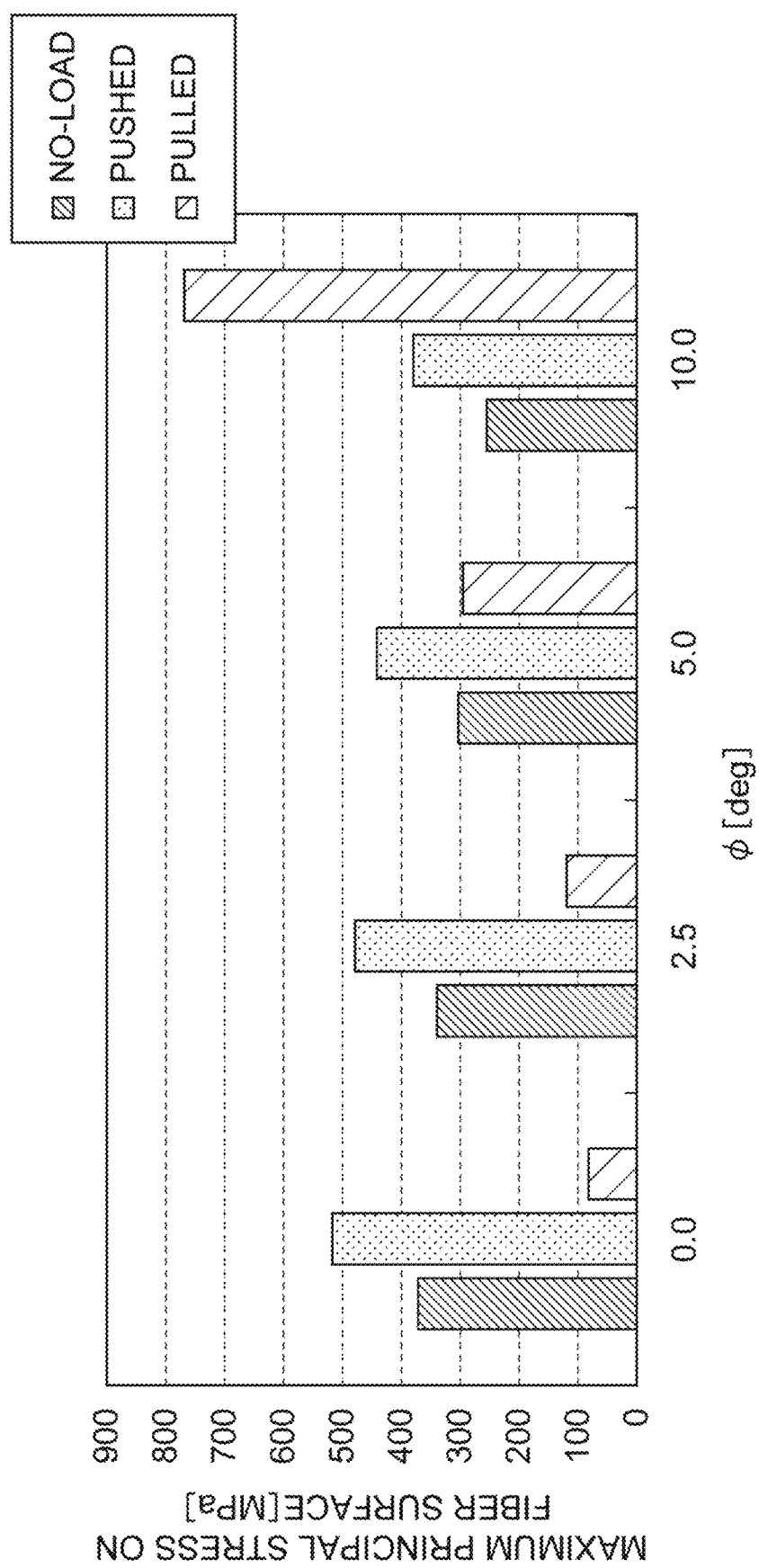
FIG. 5 is a view illustrating simulation results of stress applied to a bent portion of the optical fiber.

The foregoing inclination angle $\phi$ will be described with reference to FIG. 5. FIG. 5 illustrates results obtained through simulations of stress applied to the bent portion BA of the optical fiber of the optical connection component. The horizontal axis indicates the inclination angle $\phi$, and four conditions including 0°, 2.5°, 5°, and 10° are presumed. In addition, the vertical axis indicates the maximum principal stress which is applied to the fiber surface of the bent portion and is obtained based on simulations when optical connection components including optical fibers manufactured at the inclination angles $\phi$ are assembled as the optical module. Since the simulations were performed when the optical connection component was attached to the optical module, stress applied to the optical connection component in use was presumed. In addition, in FIG. 5, the simulations were performed for each of the four inclination angles $\phi$ presuming three conditions including a simulation with no-load (no-load), a simulation when pushed (pushed), and a simulation when pulled (pulled). The simulation with no-load was a simulation of a case using an optical fiber which was manufactured using design values and was not affected by a tolerance. In addition, the simulation when pushed was a simulation of a case using an optical fiber in which the fiber length was longer than the design value within the tolerance range. The simulation when pushed was based on the state in which the optical fiber was pushed from both ends when the optical connection component was attached to the optical module. In FIG. 5, a state in which both ends of the optical fiber were pushed 0.5 mm compared to the simulation with no-load was set as the simulation when pushed. In addition, the simulation when pulled was a simulation of a case using an optical fiber in which the fiber length was shorter than the design value within the tolerance range. The simulation when pulled was based on the state in which the optical fiber was pulled compared to the simulation with no-load when the optical connection component was attached to the optical module. In FIG. 5, a state in which both ends of the optical fiber were pulled 0.5 mm compared to the simulation with no-load was set as the simulation when pulled.

As illustrated in FIG. 5, in the simulation with no-load and the simulation when pushed, stress applied to the bent portion BA was gradually reduced by widening the inclination angle ϕ. On the other hand, in the simulation when pulled, when the inclination angle ϕ was widened, stress applied to the bent portion BA gradually increased. Therefore, it could be confirmed that even if the fiber length fluctuated within the tolerance range, stress applied to the bent portion BA of the optical fiber could be relatively curbed when the inclination angle ϕ was set to 5° or smaller.

In addition, in the optical connection component 1 according to the present embodiment, regarding the inclination angle φ of the region A in the end portion of the optical fiber 10 with respect to the direction perpendicular to the reference surface S, and the bending angle θ of the bent portion BA, relationships of $0° \leq φ \leq 15°$ and $90° \leq φ+θ$ are established. In these, it is preferable that the inclination angle φ with respect to the direction perpendicular to the reference surface S have a relationship of $0° \leq φ \leq 15°$. In a case in which the inclination angle φ is set to 0°, that is, in a case of a state in which the region A extends in the direction perpendicular to the reference surface S, when the fiber fixing part 20 of the optical connection component 1 is attached to the electronic substrate 100, there is a possibility that there may be more returning light due to reflection of light on the light input-output end surface of the optical fiber 10. In such a case, returning light can be curbed by causing the region A in the optical fiber 10 to be inclined such that the inclination angle φ becomes wider than 0° in the direction perpendicular to the reference surface S. In addition, when the region A is inclined in the direction perpendicular to the reference surface S in this manner, in order for the inclination angle ϕ of the region C to satisfy the foregoing numerical range, the inclination angle φ and the bending angle θ are controlled such that they satisfy the relationship of $90° \leq φ+θ$. Therefore, when the inclination angle φ of the region A in the end portion of the optical fiber 10 with respect to the direction perpendicular to the reference surface S, and the bending angle θ of the bent portion BA satisfy the foregoing relationships, stress applied to the bent portion BA can be reduced and performance of the optical connection component is also improved.

The optical connection component according to the present invention is not limited to the foregoing embodiment. For example, the configuration and the shape of the optical connection component including the optical fibers 10, the fiber fixing part 20, and the connector 30 can be suitably changed.

REFERENCE SIGNS LIST

1 Optical connection component
10 Optical fiber
11 Glass fiber
12 Resin coating
20 Fiber fixing part
21 V-groove substrate
22 Lid
23 Protective resin
24 Optical array member
30 Connector

The invention claimed is:

1. An optical connection component comprising:
an optical fiber having a bent portion; and
a fiber fixing part configured to fix the optical fiber to an optical module,
wherein the optical fiber includes a glass fiber and a resin coating which covers the glass fiber,
wherein the resin coating is removed and the glass fiber is exposed at one end of the optical fiber,
wherein the fiber fixing part includes an optical array member which supports an end portion of the exposed glass fiber and a protective resin which coats the optical fiber,
wherein a distal end of the glass fiber and an end surface of the optical array member form a reference surface configured to be fixed to the optical module,
wherein the bent portion is formed in a region including the exposed glass fiber and is covered with the protective resin, and
wherein a section of a region, which continues from the bent portion on a side opposite to an end portion of the optical fiber supported by the fiber fixing part with the bent portion interposed therebetween, is inclined to approach the reference surface while going away from the bent portion.

2. The optical connection component according to claim 1,
wherein the section is a shorter section of a region in which the resin coating is removed continuously from a boundary between the region and the bent portion, and a region over 5 mm from the boundary between the region and the bent portion in the region in which the resin coating is removed.

3. The optical connection component according to claim 1,
wherein the section has an inclination angle with respect to the reference surface of the optical fiber larger than 0° and smaller than 5°.

4. The optical connection component according to claim 1,
wherein the end portion of the optical fiber supported by the fiber fixing part has an inclination angle φ with respect to a direction perpendicular to the reference surface, the bent portion has a bending angle θ, and the inclination angle φ and the bending angle θ satisfy the relationships $0° \leq φ \leq 15°$ and $90° \leq φ+θ$.

* * * * *